UNITED STATES PATENT OFFICE.

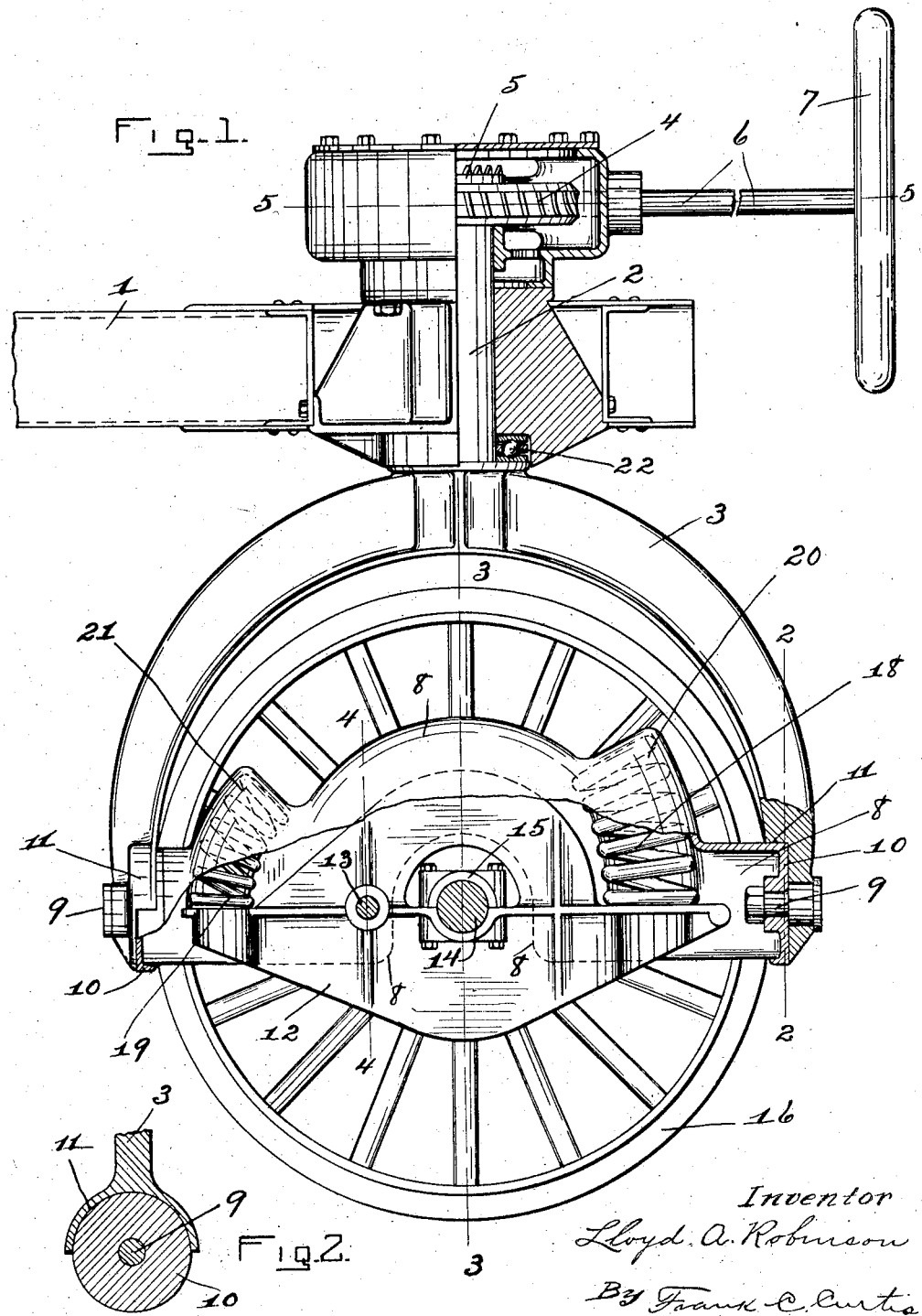

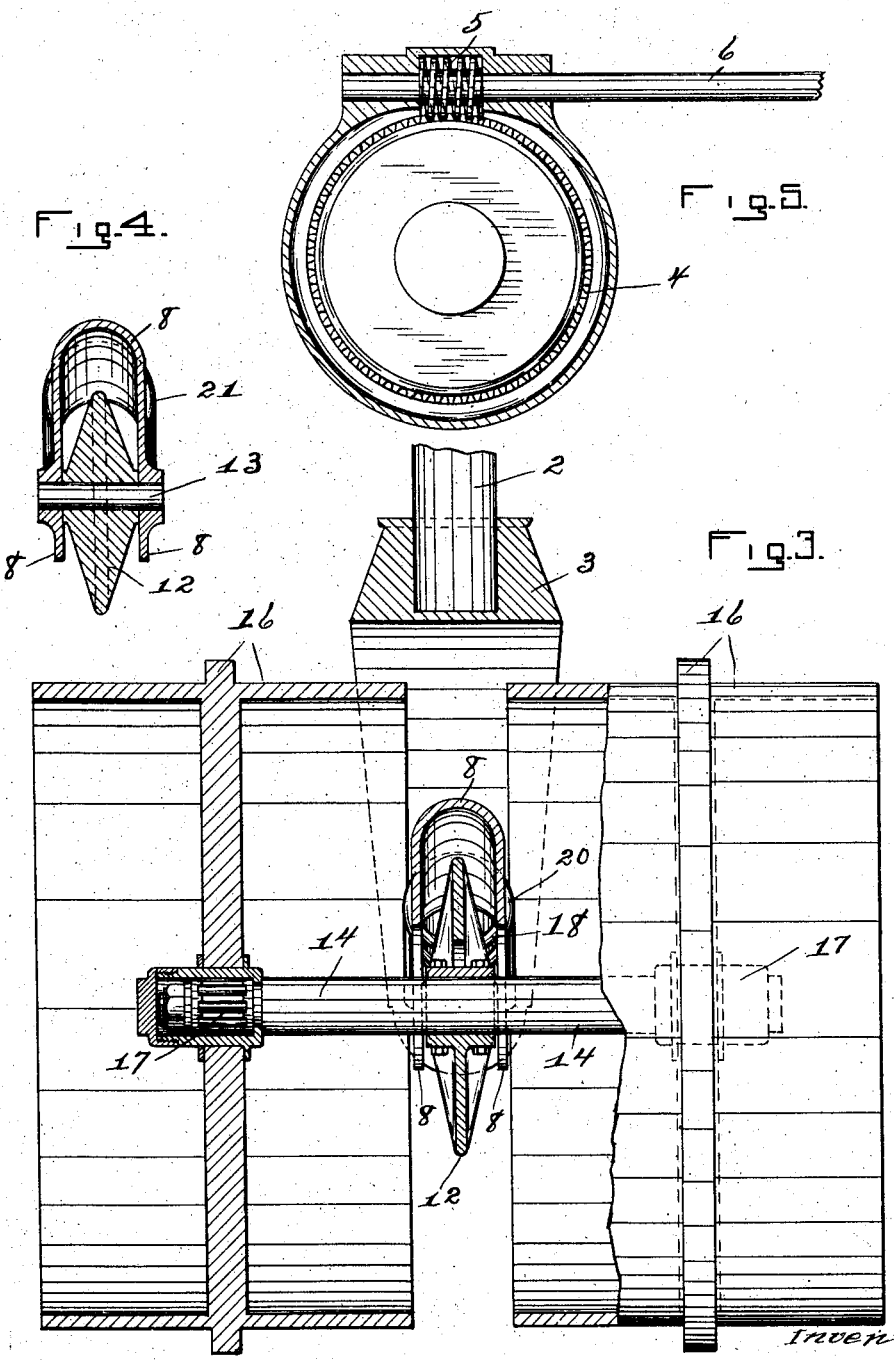

LLOYD A. ROBINSON, OF TROY, NEW YORK, ASSIGNOR TO DUPLEX TRACTOR COMPANY, INC., OF TROY, NEW YORK, A CORPORATION OF NEW YORK.

TRACTOR STEERING MECHANISM.

1,333,683.  Specification of Letters Patent.  Patented Mar. 16, 1920.

Application filed June 9, 1919. Serial No. 302,707.

*To all whom it may concern:*

Be it known that I, LLOYD A. ROBINSON, a citizen of the United States, residing at Troy, county of Rensselaer, and State of New York, have invented certain new and useful Improvements in Tractor Steering Mechanisms, of which the following is a specification.

Reference may be had to the accompanying drawings, and the reference characters marked thereon, which form a part of this specification. Similar characters refer to similar parts in the several figures therein.

This invention relates to mechanism for steering vehicles of various kinds, and is particularly adapted for use with various kinds of tractors.

Certain objects of the invention are to readily control the direction of movement of the vehicle particularly over an uneven path; and to relieve the steering mechanism from much of the shock caused by the passage of the guiding-member of the steering mechanism over an uneven path.

Other objects will appear in connection with the following description.

Figure 1 of the drawings is a view in side elevation, partly broken away and partly in central vertical longitudinal section, of my improved steering mechanism mounted upon the frame of a tractor.

Fig. 2 is a vertical cross section of the same taken on the broken line 2—2 in Fig. 1.

Fig. 3 is a vertical cross section of the same taken on the broken line 3—3 in Fig. 1.

Fig. 4 is a vertical cross section of the same taken on the broken line 4—4 in Fig. 1, through the pivotal connection between the shaft-carrying beam and the housing-frame.

Fig. 5 is a horizontal section taken on the broken line 5—5 in Fig. 1, through the worm-gear whereby the steering mechanism is controlled.

Referring to the drawings wherein the invention is shown in preferred form, 1 is part of the frame or chassis of a tractor or the like, the other end of said frame being supported in any known manner upon wheels of the like, not shown.

As the vehicle may be propelled in any known manner, I have omitted to show any particular propelling means, it being understood that the vehicle is preferably driven by some type of gas or steam engine.

Rotatively mounted upon the frame, 1, by means of a vertical spindle, 2, is a yoke, 3, to which rotatory movements may be imparted by means of a worm-wheel, 4, fixed upon the upper end of the spindle, 2, in engagement with a worm, 5, on a steering shaft, 6, upon which shaft is fixed a steering-wheel, 7, in the usual manner.

A housing-frame, 8, extends across the yoke and is rockably or pivotally connected with the respective ends of the yoke as by a pivot-bolt, 9, at each end.

The ends of the housing-frame however, are preferably made in the form of trunnions, 10, for which bearings, 11, are provided in the respective ends of the yoke, 3, whereby the pivot-bolts, 9, are substantially relieved of strain.

A beam, 12, extends longitudinally of the housing-frame, 8, being pivoted thereto by means of a cross-pin, 13, as more particularly shown in Fig. 4. At the point of such pivotal connection, the housing-frame, 8, is of substantially inverted U-shape in cross section; and the beam, 12, is pivoted between the side-members of the housing-frame.

A horizontal cross shaft, or axle, 14, is mounted upon the beam, 12, by means of a clamp, 15, and upon the opposite ends of this cross-shaft, 14, are mounted a pair of wheels, 16, which together constitute the guiding means for the steering mechanism.

I have shown these wheels mounted upon the cross shaft, 14, by a conventional form of roller-bearing, 17, permitting the wheels to rotate independently of each other upon said shaft.

For certain purposes of the invention, however, any other known form of guiding mechanism adapted to support the beam, 12, may be employed in place of the shaft, 14, and wheels, 16.

Between the housing-frame, 8, and the beam, 12, on the opposite side of the shaft, 14, from the pivotal connection, 13, is interposed a coil-spring, 18, whereby the load carried by the housing-frame is yieldingly supported by the beam, 12, which in turn is supported by the guiding-wheels, 16.

Another coil-spring, 19, is interposed between the beam, 12, and the housing-frame, 8, in opposed relation to the spring, 18, as by interposing said spring, 19, between the beam and the housing-frame on the opposite side of the pivotal connection, 13, from the shaft, 14, and thus on the opposite side of said pivotal connection, 13, and the shaft, 14, from the spring, 18.

The springs, 18 and 19, are preferably seated in spring-chambers, 20 and 21, formed by enlargements of the housing-frame, 8, whereby the springs are properly retained in position.

A ball-bearing, 22, may be provided for the spindle, 2, if desired.

I have shown my steering-mechanism applied to the rear end of the frame, 1, but is immaterial whether it be applied to the rear end or the front end of the vehicle.

In controlling the direction of movement of the vehicle, the driver or operator turns the hand-wheel, 7, in the usual manner, thereby through the worm-gear mechanism, 4, 5, imparting a rotative movement in one direction or the other to the spindle, 2, and yoke, 3. This causes a corresponding rotatory movement about the axis of said spindle, 2, of the parts carried by the yoke, 3, including the housing-frame, 8, beam, 12, shaft, 14, and guide-wheels, 16, causing the guide-wheels, 16, to change the direction of progressive movement of the vehicle in accordance with the wishes of the driver.

During such swinging movement of the guiding-wheels, 16, they are free to, and will automatically, adjust themselves to any inequalities in the path over which they are traveling, due to the rocking movement of the housing-frame upon the axis of the trunnions, 10, whereby it is rotatively mounted upon the yoke, 3.

Shock and jars due to the inequalities of the surface over which the guiding wheels, 16, are traveling are largely taken up and relieved by the coil-spring, 18, while the reaction or rebound of said spring, 18, is largely taken up by the opposed spring, 19, thus relieving the steering mechanism to a large extent from the shock and strain due to irregularities in the path traversed by the guiding wheels.

What I claim as new and desire to secure by Letters Patent is—

1. In a steering mechanism for vehicles and in combination, a yoke pivoted upon a vertical axis; means for rotatively moving said yoke upon said axis; a housing-frame extending across, and having its ends pivotally mounted on a horizontal axis upon the respective ends of, the yoke; a beam extending longitudinally of said housing-frame; guiding mechanism carried by and supporting said beam; and a pivotal connection between said beam and said housing-frame on one side of, and a spring interposed between said housing-frame and said beam on the opposite side of, the point whereat said beam is supported by said guiding mechanism.

2. In a steering mechanism for vehicles and in combination, a yoke pivoted upon a vertical axis; means for rotatively moving said yoke upon said axis; a housing-frame extending across, and having its ends pivotally mounted on a horizontal axis upon the respective ends of, the yoke; a beam extending longitudinally of said housing-frame; guiding mechanism carried by and supporting said beam; a pivotal connection between said beam and said housing-frame on one side of, and a spring interposed between said housing-frame and said beam on the opposite side of, the point whereat said beam is supported by said guiding mechanism; and a second spring interposed between said housing-frame and said beam in opposed relation to said first-mentioned spring.

3. In a steering mechanism for vehicles and in combination, a yoke pivoted upon a vertical axis; means for rotatively moving said yoke upon said axis; a housing-frame extending across, and having its ends pivotally mounted on a horizontal axis upon the respective ends of, the yoke; a beam extending longitudinally of said housing-frame; a cross-shaft carried by and supporting said beam; a pair of wheels carried by and supporting the opposite ends of said cross-shaft; and a pivotal connection between said beam and said housing-frame on one side of, and a spring interposed between said housing-frame and said beam on the opposite side of, the point whereat said beam is supported by said cross-shaft.

4. In a steering mechanism for vehicles and in combination, a yoke pivoted upon a vertical axis; means for rotatively moving said yoke upon said axis; a housing-frame extending across and having its end pivotally mounted on a horizontal axis upon the respective ends of the yoke; a beam extending longitudinally of said housing-frame; a cross-shaft carried by and supporting said beam; a pair of wheels carried by and supporting the opposite ends of said cross-shaft; and a pivotal connection between said beam and said housing-frame on one side of, and a spring interposed between said housing-frame and said beam on the opposite side of, the point whereat said beam is supported by said cross-shaft; and a second spring interposed between said housing-frame and said beam in opposed relation to said first mentioned spring.

In testimony whereof I have hereunto set my hand this 21st day of April, 1919.

LLOYD A. ROBINSON.